(12) United States Patent
Fitzner

(10) Patent No.: US 7,266,415 B2
(45) Date of Patent: Sep. 4, 2007

(54) METHOD OF AND APPARATUS FOR OPERATING WORKING MACHINES

(75) Inventor: Werner Fitzner, Sassenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 308 days.

(21) Appl. No.: 10/912,639

(22) Filed: Aug. 5, 2004

(65) Prior Publication Data

US 2005/0033454 A1 Feb. 10, 2005

(30) Foreign Application Priority Data

Aug. 8, 2003 (DE) ................ 103 36 771

(51) Int. Cl.
*G05B 11/01* (2006.01)

(52) U.S. Cl. ........................................ 700/17
(58) Field of Classification Search .......... 700/170, 700/12, 37, 52, 28, 87
See application file for complete search history.

(56) References Cited

U.S. PATENT DOCUMENTS

| 4,527,241 | A | * | 7/1985 | Sheehan et al. | 701/50 |
| 4,947,315 | A | * | 8/1990 | Sokolow et al. | 717/111 |
| 5,115,390 | A | * | 5/1992 | Fukuda et al. | 700/17 |
| 5,640,576 | A | * | 6/1997 | Kobayashi et al. | 704/9 |
| 6,052,656 | A | * | 4/2000 | Suda et al. | 704/9 |
| 6,173,441 | B1 | * | 1/2001 | Klein | 717/142 |
| 6,205,384 | B1 | * | 3/2001 | Diekhans | 701/50 |
| 6,453,465 | B1 | * | 9/2002 | Klein | 717/141 |
| 6,501,997 | B1 | * | 12/2002 | Kakino | 700/28 |
| 6,658,305 | B1 | * | 12/2003 | Gudmundsson et al. | 700/52 |
| 6,863,604 | B2 | * | 3/2005 | Behnke | 460/6 |
| 2003/0083757 | A1 | * | 5/2003 | Card et al. | 700/28 |
| 2004/0049297 | A1 | * | 3/2004 | Card et al. | 700/28 |

FOREIGN PATENT DOCUMENTS

EP 0 586 999 A2 3/1994

* cited by examiner

*Primary Examiner*—Thomas K. Pham
(74) *Attorney, Agent, or Firm*—Michael J. Striker

(57) ABSTRACT

A method for operation of a working machine with at least one adjustable operating parameter of at least one working unit of the working machine, includes associating the working machine with a control generator coupled to a control editor for changing the at least one operating parameter; providing controls in the control generator, and changing the controls by the control editor.

19 Claims, 4 Drawing Sheets

METHOD OF AND APPARATUS FOR OPERATING WORKING MACHINES

BACKGROUND OF THE INVENTION

The present invention relates to a method of and an apparatus for operating of working machines.

European patent document EP 0 586 999 discloses a machine control system, which among others can be used on agricultural harvesters, such as combine harvesters for optimization of operational parameters which determine the adjustment. The agricultural working machines can be trained, with consulting of neuronic network systems, from their own use. In this training phase optimized operational parameters are determined depending on inner and outer boundary conditions, which must provide a production increase of the combine harvester in the working operation. For allowing the operator of the combine harvester to carry out and in some cases to influence the optimization process, the combine harvester indicates via a graphic indication surface, the course of various parameters of the agriculture working machine. In addition, the operator of the combine harvester can manually change various parameters via this display. The graphic display indicates simultaneously the effects on various other parameters, and the sensors that are required for this are integrated in the agricultural harvester.

Because of the complex relationship between the operational parameters of the harvester and the various parameters of the crop, the operator of the combine harvester with such indicating and control units must have a significant special knowledge, to provide an optimal adjustment of the various operation parameters of the combine harvester in the shortest possible time. Because of the high complexity of the indication, for a person skilled in the art it is difficult to recognize the effect of a parameter change in addition, the operator must have a significant special knowledge about the complex relationship between the operational parameters and the crop parameters, since with consideration of defined crop properties and harvesting conditions, only the change of completely predetermined operational parameters and also only within the predetermined limits provides an improvement of the efficiency of the agricultural working machine. If the operator lacks this special knowledge the optimization, despite computer-supported machine control, can take a significant time period. This is however a very negative factor for the productivity of the agricultural working machine.

SUMMARY OF THE INVENTION

Accordingly, it is an object of the present invention to provide a system for optimization of parameter adjustments on a working machine, which eliminates the disadvantages of the prior art by providing efficient guidance of the operator of the working machine by the system to optimized operational parameters.

In keeping with these objects and with others which will become apparent hereinafter, one feature of the present invention resides, briefly stated, in a method of operation of a working machine with at least one adjustable operating parameter of at least one working unit of the working machine, the method comprising the steps of associating the working machine with a control generator coupled to a control editor for changing the at least one operating parameter; providing controls in the control generator; and changing the controls by the control editor.

Another feature of the present invention resides, briefly stated, in an apparatus for operating a working machine with at least one adjustable operation parameter of at least one working unit of the working machine, wherein the apparatus comprises a control generator which is coupled with a control editor for changing the at least one operating parameter of the working machine, said control generator being operative for storing controls which are editable by said control editor.

Since in the working machine for changing at least operational parameter a working element is associated with a control generator coupled with a control editor, in which control generator the adjustment controls (rules) for the operational parameter changeable by the control editor are stored, it is guaranteed that one operational parameter or a plurality of operational parameters can be adapted in a simple manner to changeable crop conditions.

An especially efficient method for optimization of the operational parameters is provided when the controls stored in the control generator are defined by natural language program steps. In this way, for the user of the control generator their use for optimization of the operational parameters is simplified. Without specific knowledge about the very complicated relationship between the operational parameters and the crop properties, the user can define in natural language the problems, which are then answered in natural language by the controls stored in the control generator. Thereby the use of a natural language-operating control generator even by the unexperienced operator of a working machine provides an efficient possibility of the operational parameter adjustment of a working machine, since the operator must define only the concrete problem, and the control generator provides for the operator the operational parameter to be changed and the value region of the operational parameter to be changed.

In accordance with a preferable embodiment of the invention, in order to provide a programming simplification, the terminology of the natural language program steps is stored in language elements. Thereby it is guaranteed that the same problem descriptions and the same solutions have the same language elements for different application cases.

In order to provide the advantage that the operator of the control generator connected with the control editor does not need special knowledge of programming, in accordance with a further embodiment of the present invention the language elements are connected with a source code stored in the control generator. Thereby the problem defined by the operator by the selected language elements forms input data which lead directly to generation of a control, wherein the output data for the operational data to be optimized defined in the control simultaneously represent the solution of the defined problem.

The quality of the parameter optimization is more efficient with an increase in a volume of the information content of the input data. In accordance with a further advantageous embodiment of the present invention, the input data of the operational parameters of the working machine are determined by defined problems in the operation of the working machine, by inner and outer boundary conditions, as well as by objectives to be achieved during the operation of the working machine.

A further substantial advantage of the natural language operating control generator is that the natural language output data of the generated control supplied to the operator of the working machine can be directly read by him, to determine which operational parameters of the working machine must be changed.

Depending on the application case, the control generator can be formed so that the optimized nominal values of the operational parameter are indicated to the operator of the working machine visually and/or acoustically.

An especially simple embodiment of the new controls can be provided when the controls to be generated are structured as so-called "when-then" controls. In this way the user of these informations obtains very fast view about the very complicated relationship between the operational parameters of the working machine and the crop properties. For the producer of a new control, it can be helpful when the new controls are formed in known signal flow representations or by decision tables.

An especially cost-favorable optimization process is provided when the control generator connected via a control editor is arranged centrally and can be contacted via suitable data exchange systems by a plurality of working machines for determination of optimal operational parameters of the corresponding working machine. In this way, it is not necessary to connect each working machine through an electronic data processing unit for integration of the control generator on the corresponding working machine.

For making available the generated controls to the operators of other machines, the generated controls in accordance with an advantageous embodiment of the present invention are exchangeable between a plurality of working machines. This shortens the optimization process significantly since with such an embodiment the controls generated by control generators of other working machines under the same conditions can be picked up.

The application region of the inventive method can be increased when the stored controls embrace only adjustment advices or mounting instructions. In this manner the control generator can be also used during conversion or repair works for efficiency increase.

For relieving the operator of the working machine, in accordance with an advantageous embodiment of the present invention, it is proposed that the determined operational parameters are adjusted automatically on the corresponding working units.

In an advantageous further embodiment of the present invention it can be provided that the operator of the agricultural working machine performs an assessment of the optimized operational parameter, which then can be taken into consideration during the generation of new controls or the change of existing controls.

An especially simple conversion of the inventive process in an apparatus can be performed when the working machine has at least one inputting- and indicating unit for generation of data sets. The inputting- and indicating unit is connected with a control generator which includes a control editor, and in which the controls for adjustment of the operational parameters of the working units of the working machine are stored and are editable, and the editing- and retrieving process in natural language is performed.

Special advantages of the inventive method and of the inventive apparatus are provided in the area of the agricultural working machines, since here in addition to complex influences of the adjustable operational parameters, the significant loads of the operator of the agricultural working machine are applied during its operation and pose high requirements to his knowledge and understanding.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
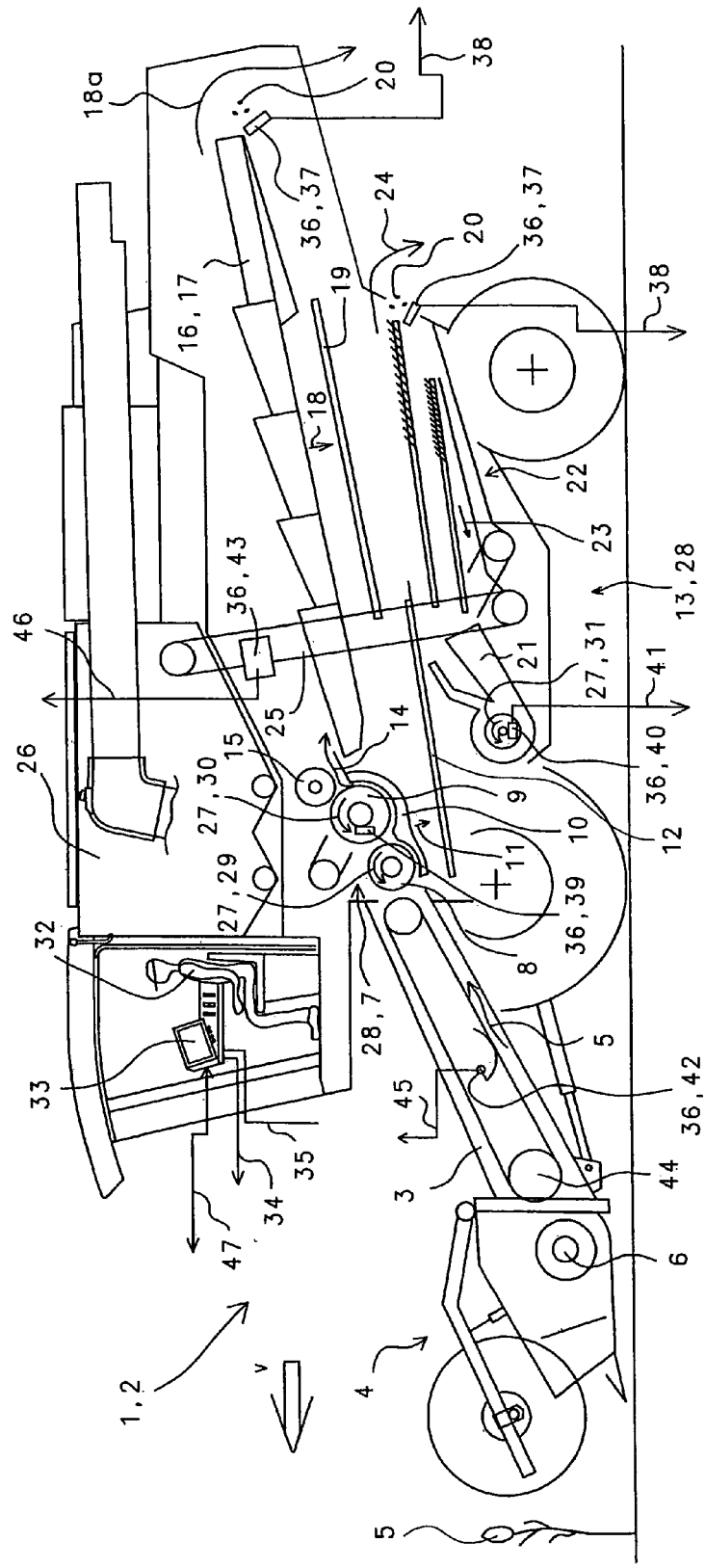
FIG. 1 is a side view of a working machine in accordance with the present invention, which is formed as a combine harvester.

FIG. 1 shows a working machine 1 formed as a combine harvester 2. In its front region it has a cutting mechanism 4 which is arranged on a feed rake 3, harvests the growing crop 5, and supplies it through a transporting element 6 to the feed rake 3. The crop 5 in a known manner is supplied via the feed rake 3 to a threshing unit 7. In the shown embodiment the threshing unit 7 includes a first threshing drum 8, and a subsequent second threshing drum 9.

In the region of the threshing unit 7, on a threshing concave 10, a first product stream 11 which is composed substantially of grains, short straw and chaff is separated. It is supplied via a grain tank 12 to a cleaning device 13. A further product stream 14 is transmitted in a rear region of the threshing unit 7 by a beater 17 to a separating device 16 which is formed as a hurdle shaker 17. A further product stream 18 which is composed substantially of grains, short straw and chaff, is transported on the hurdle shaker 17 through a return pan 19 and the grain pan 20, also to the cleaning device 13. In addition at the end of the hurdle shaker 17, a product stream 18a which is composed substantially of straw and a small portion of grains or so-called grain loss 20, is discharged from the combine harvester 2.

Within the spirit of the present invention, the threshing units 7 and the hurdle shakers 17 can be replaced by known axially running threshing and separating rotors, and also only the hurdle shakers 17 can be replaced with an axially running separating rotor.

The cleaning device 13 which is composed substantially of a blower 21 and sieve devices 22, unites the product streams 11 and 18 so that a grain stream 23 composed substantially of grains and a further product stream 24 composed substantially of short straw, chaff and the portion of loss grains 20 is formed. The grain stream 23 is finally supplied via a feed rake 25 into a so-called grain tank 26.

For providing a high threshing degree of the threshing unit 7 and a small portion of loss grains, with a high traveling speed v of the combine harvester, various operational parameters 27 of the working units 28 of the combine harvester 2 are adjustable. For illustrating the present invention, in the shown embodiments only important operational parameters 27 of the combine harvester 2 are discussed. A working unit 28 formed the threshing unit 7 composed of the threshing drums 8, 9 and the threshing concave 10 which at least partially surrounds them, whose operational parameters 27 are the rotary speeds 29, 30 of the threshing drums 8, 9. A further important working unit 28 of the harvester thrasher 2 forms the cleaning device 13 composed of the blower 21 and the sieve device 22. Here the blower rotary speed 31 forms for example the operational parameter 27 to be sensed.

In a known manner, the operator 32 for adjustment of the operational parameters 27 has either adjusting means available directly on the corresponding working units 28, or he can input these adjustments via an inputting and indicating unit 33. The direct adjustment of this operational parameter 27 can be provided by known adjusting means, in that the inputting- and indicating unit 33 generates adjusting signals 34 which are transmitted via a data transmission system 35 to the adjusting means.

For providing with the adjustable operational parameters 27 a low grain loss 20 and simultaneously traveling speeds v adapted to the corresponding throughput, the combine harvester 2 in a known manner allows via different sensor units 36 to determine both crop-specific and machine-specific parameters 27 inside the working machine 1, which parameters are drawn then for optimization of the respective operational parameters 27. The sensor unit 36 in the simplest case include so-called grain loss sensors 37. As a rule, they generate grain loss signals 38 from a grain sound produced by the contact of the grains with the grain loss sensors 37. The grain loss signals 38 make possible the value-related illustration of the grain loss 20 in the inputting and indicating unit 33. A further group of the sensor units 36 is formed by known rotary speed sensors 39, 40 which are used for example for determination of a threshing drum rotary speed 30 and the blower rotary speed 31. Each rotary speed sensor 39, 40 generates input signals 41 (for the sake of clarity FIG. 1 only shown for the sensor 40), which in the inputting- and indicating unit 33 are computed to real values for the respective rotary speed 30, 31 and in some cases are indicated.

For determining the product throughput of the combine harvester 2, the combine harvester 2 can be further provided with so-called throughput sensors 42, 43. One of the throughput sensors 42 is arranged in the region of the feed rake 30 in a known manner. The throughput sensor 42 determines the crop quantity-dependent deviation of the rotating transporting means 44 and from it generates an input signal 45 which leads in the inputting and indicating unit 33 to illustration of real values for the total throughputs of the crop 5.

The further throughput sensor 43 is formed as a known grain quantity sensor 43 and is arranged in the feed elevator 25 which leads to the grain tank 26. The input signal 46 generated by the grain quantity sensor 43 finally leads in the inputting- and indicating unit 43 to showing of a real corn quantity value. In addition, the combine harvester is connected with a known data exchange system 47, through which by means of the inputting- and indicating unit 33, data can be exchanged between the combine harvester 2 and various external systems.

Figure 2:
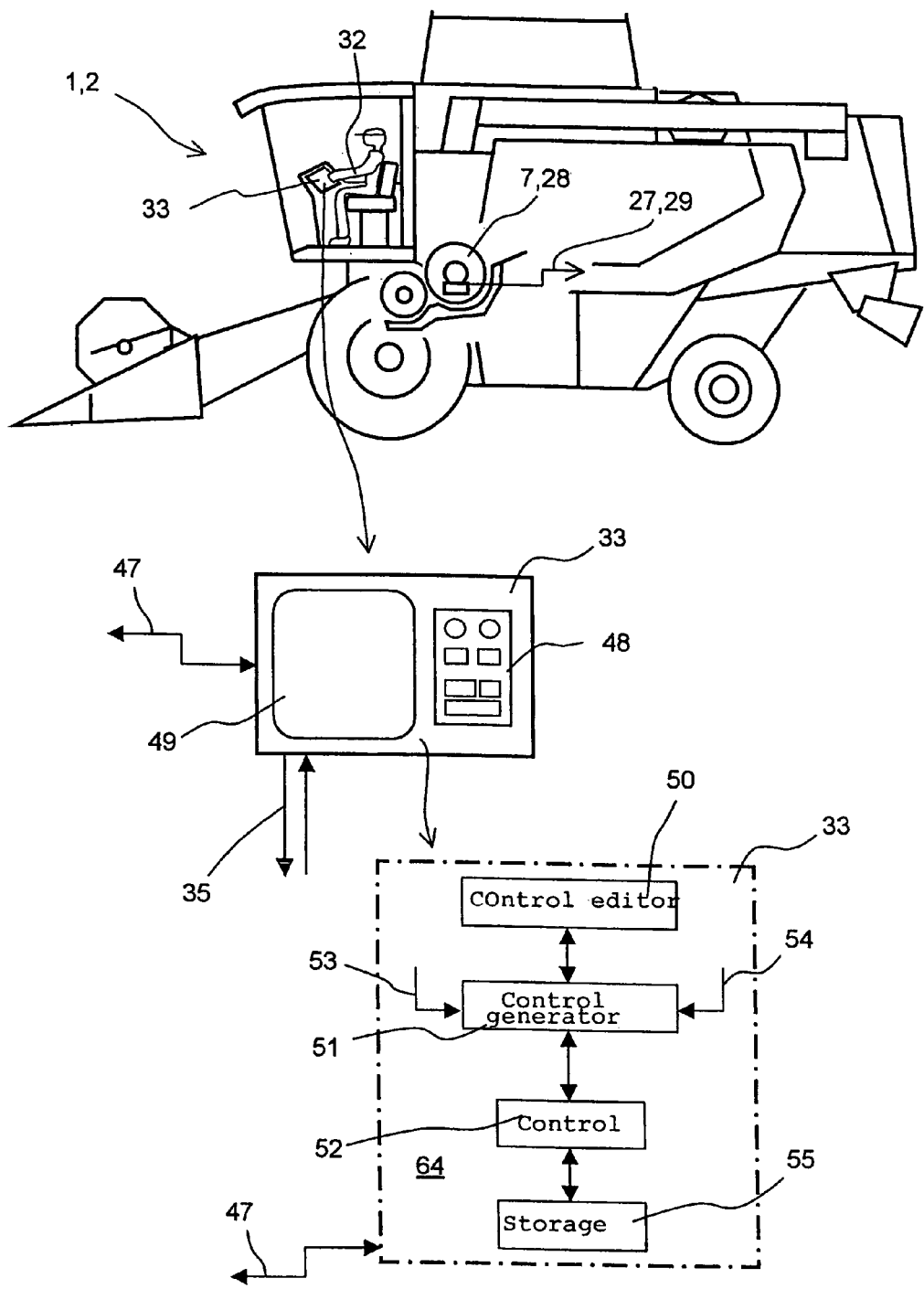
FIG. 2 is a schematic view showing an inputting- and indicating unit with a control editor and a control generator in accordance with the present invention.

As shown in FIG. 2, the inputting- and indicating unit 33 associated with the agricultural working machine 1 is available through an input terminal 48 as well as through an indicating display 49. In a known manner which is therefore not illustrated, the operator 32 of the agricultural working machine 1 can retrieve and edit various operational parameters 27 of the working units 28 of the combine harvester 2 through the input terminal and the data transmission system 35. In addition, for the operator 32 graphically and/or alpha-numerically via the indicating display 49, various operational parameters 27 as well as crop properties and for example weather-dependent outer boundary conditions can be indicated permanently or on demand.

In accordance with the present invention a control editor 50 operatable via the input terminal 48 is associated with the inputting- and indicating unit 33 and is in operative connection with a control generator 51. The control generator 51 is formed by a program module which is capable of generating adjusting controls 52 for the operational parameters 27 of the working units 28 of the working machine 1. The control generator 51 during the production of the controls 52 takes into consideration various machine-internal and machine-external parameters 53, 54. For example, the machine-internal parameters 53 include the operational parameters 27 of the working units 28, the product type, the product throughput 45, 46 as well as crop-specific parameters, such as the product moisture, the grain loss 20, as well as breakage grain portion which depends on the mechanical load of the crop in the combine harvester 2. In contrast, the machine-external parameters 54 are determined substantially by the outer weather conditions, such as temperature and moisture, the time of the day, as well as weather forecasts and geographical peculiarities of the application area of the working machine. It has to be mentioned that the number of the machine-internal and machine-external parameters 53, 54 are presented only exemplary, and can be extended to include further, not explicitedly mentioned machine-interior as well as machine-exterior parameters 53, 54.

The control generator 51 in addition is designed so that it can store the generated controls 52 in a storage module 55. The cooperation of the control generator 51 with the control editor 50 associated therewith is designed in an inventive manner so that the operator either retrieves directly the controls 52 stored in the storage module 55, changes the stored controls 52 or generates new controls 52, wherein these changed or newly generated controls 52 are again storable in the storage module 55. For increasing the application area of the control generator 51, the stored controls 52 can also contain adjustment advices and conversion instructions, so that the control generator not only optimizes the operational parameters 27 of the working elements 28, but also accelerates the conversion and repair processes.

Figure 3:
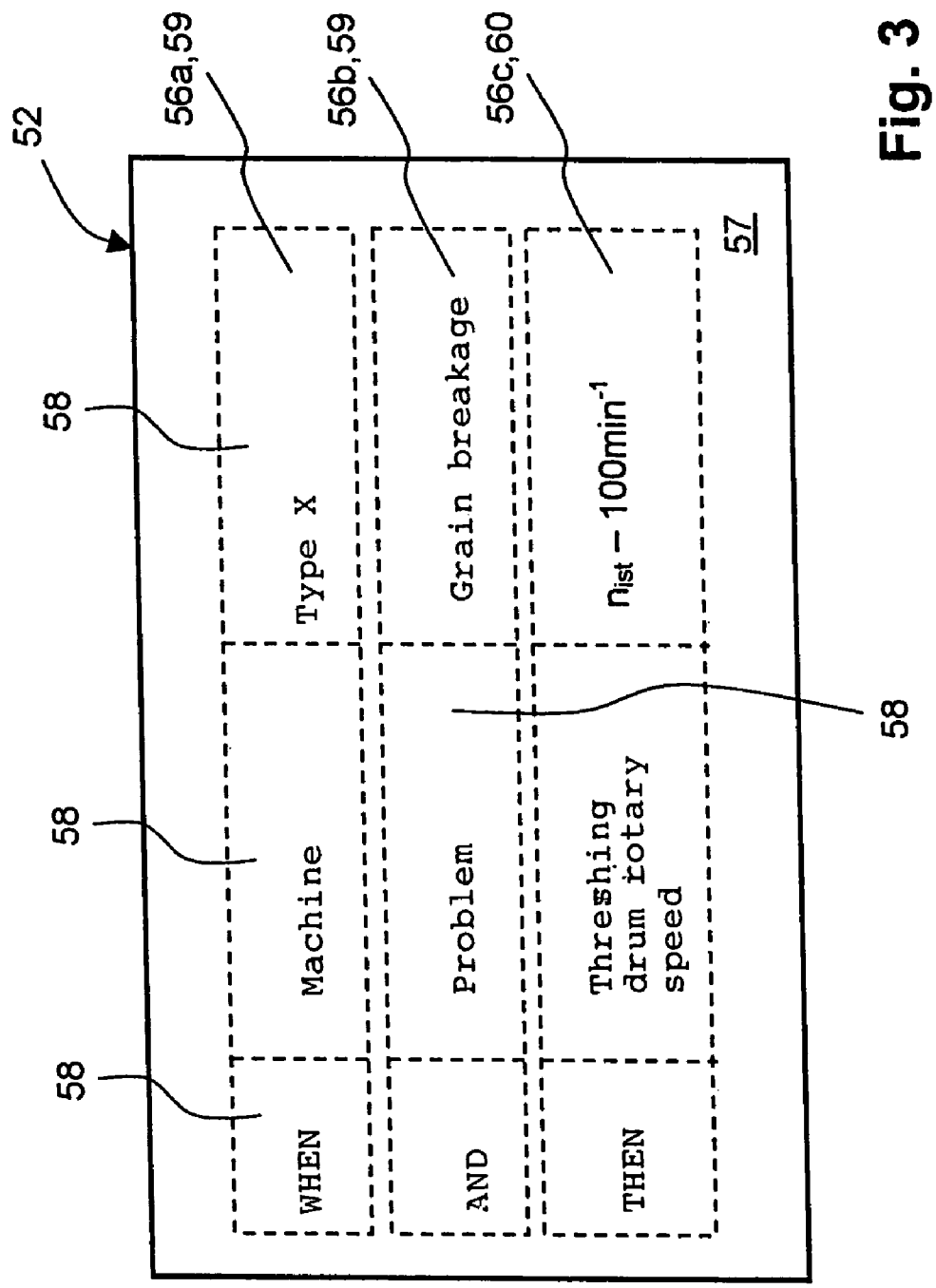
FIG. 3 is a view showing an input mask of a control editor in accordance with the present invention.

For performing the change of the stored controls 52 or the generation of new controls 52 independently from special programming knowledge in fast and efficient manner, the controls 52 as schematically shown in FIG. 3, are defined in accordance with the present invention by natural language programming steps 56a-c. It is within the spirit of the present invention that the natural language programming steps 56a-c can be also formed as known signal flow charts or decision tables. For illustration of the principle, one control 52 which takes into consideration only a few boundary conditions is shown.

In the control editor 50 which is an operative connection with the control generator 51, the input masks 57 schematically shown in FIG. 3 can be retrieved by the operator 32 via the input terminal 48 for generation of a control 52. In a first programming step 56a the type of the agricultural working machine is defined, wherein here a fully specific product of manufacture is determined. In a further programming step 56b the occurring problem, here grain breakage is determined. In the last program step 56c, it is finally defined that with the mentioned boundary conditions the threshing drum rotary speed 29, 30 is reduced by 100 min$^{-1}$. The control 52 generated in the control editor 50 is transmitted into the control generator 51 and stored in the available storage module 55.

In the shown embodiment the generated control 52 takes into consideration all machine-interior parameters 53, namely the machine type and the corn breakage which is detected in the machine with known and not described in detail drain breakage sensors. The indicated control 52, depending on these two machine-internal parameters 53, determines a relative adjustment instruction, namely the reduction of the instantaneous threshing drum rotary speed 29, 30 by 100 min$^{-1}$. As will be seen herein below, the inventive controls 52 can take into consideration a plurality of machine-internal and machine-external parameters 53, 54 and to generate from them optimized values for the operational parameters 27 of the working units 28 of the working machine 1.

For enabling different operators 32 to generate controls 52 with the control editor 50, the terminology of the program steps 56a-c is assembled in language elements 58, which are connected with a source code provided in the control generator 51. This guarantees that the same problems are always described identically in the control generator 51 and additionally reduces the required programming and storage expenses. Since further the language elements 58 are adapted to the expert language of the corresponding areas, in the shown embodiment the area of agricultural working machines 1 and here specifically adapted to the combine harvester 2, it is guaranteed that any operator 32 represents the same facts always in the same way in the control generator 51.

With the proposed connection of the language elements 58 with the source code, the natural language structured program steps 56a-c incorporate either input data 59 or output data 60 of the generated control 52. The input data can include operational parameters 27 of the working machine 1, problems during the operation of the working machine, interior and exterior boundary conditions, and objectives to be achieved during the operation of the working machine. The output data 60 can be formed substantially by the nominal values of the operational parameters 27 of the working units 28 of the working machine 1. Within the spirit of the present invention, the nominal values of the operational parameters, in addition to the illustrated visual indication can be also represented acoustically. The generation of the controls 52 by an operator 32 is further simplified when the controls 52 are structured as so-called "when-then" controls, that significantly contribute to improved understanding of the relationship between the operating parameters 27 and the crop properties as well as the stored program courses.

Figure 4:
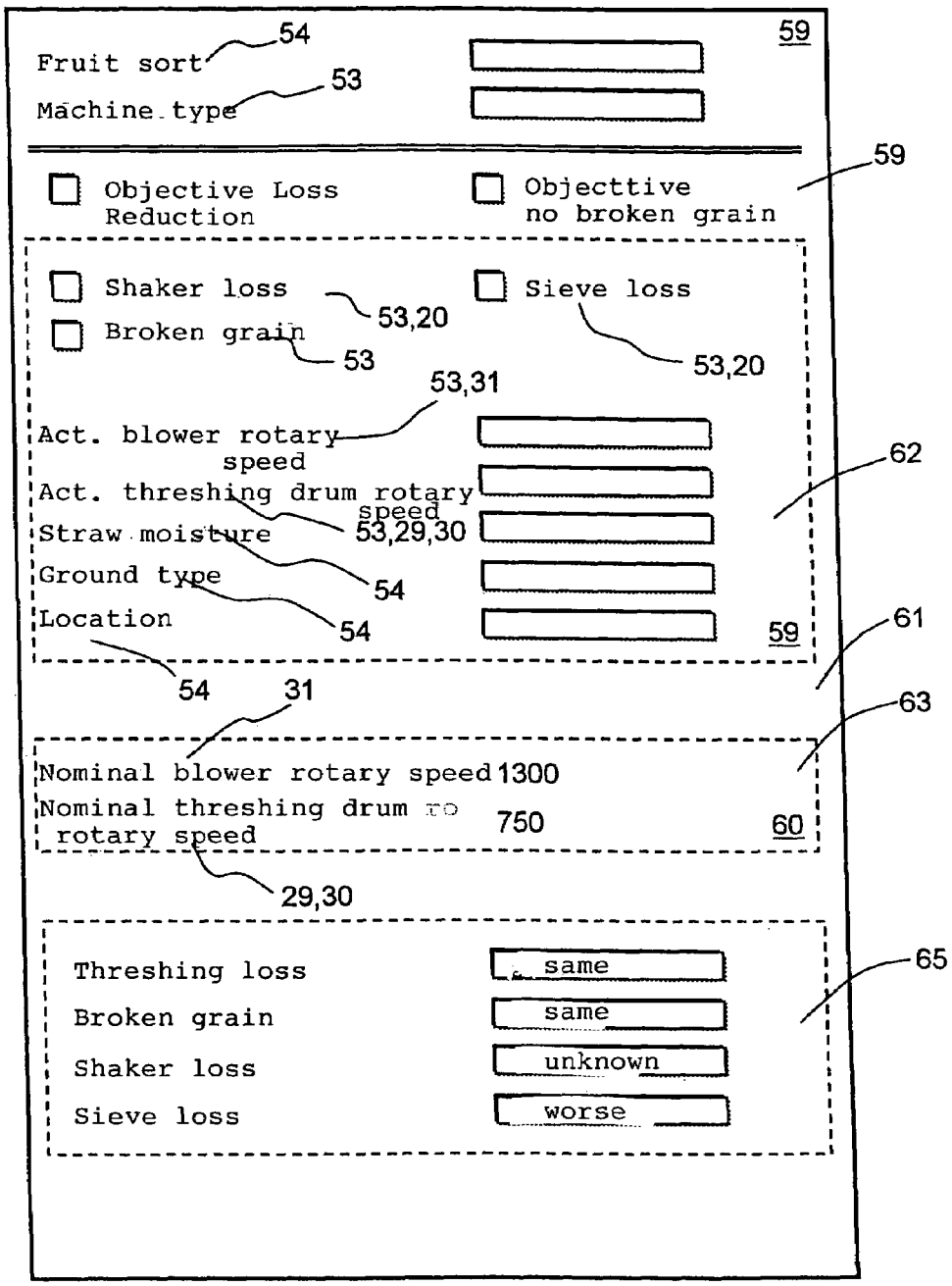
FIG. 4 is a view showing an input mask of the inputting- and indicating unit in accordance with FIG. 2, of the present invention.

For the operator 32 which uses the control generator 51 alone without simultaneously defining new controls 52 via the control editor 50, a mask 61 which is editable via the input terminal 48 is made available in the indicating display 49 as shown in FIG. 4. In the mask 61 first the machine-external parameter "fruit sort" 54 as well as the machine-internal parameter "machine type" 53 is to be defined.

Within the spirit of the present invention, the parameter "fruit sort" and "machine type" can be generated also automatically by the inputting and indicating unit 33. Then the operator 32 selects the desired objective, here either" no breakage corn "or" loss lowering", wherein both parameters form the machine-internal parameters 53. Further, the mask 61 via an actual data field 62 provides in the machine-internal parameters 53 shaker losses 20, sieve losses 20, breakage corn, blower rotary speed 31, threshing drum rotary speeds 29, 30, as well as the machine-external data 54 straw moisture, soil type and geographical position of operation of the working machine 1, which are editable. In the known manner these parameters 53, 54 can be generated by suitable sensors 36 or manually inputted by the operators 32. In the result data field 63 finally the output data 60 obtained by the control 52 stored in the control generator 51, here the blower rotary speed 31, as well as the threshing drum rotary speeds 90-30, are indicated.

For providing the optimization of the operational parameters 27 of the working machine 1 carried out by means of the control generator 51 with a higher quality, in the shown embodiment of FIG. 4 significantly more input data 59 are available for generation of the output data 60, so that the control 52 used here is available via a great number of natural language-structure program steps 58.

In a preferable further embodiment of the present invention, it can be provided that the optimized operational parameters 27 determined in the output data 60 are adjusted in a known manner automatically on the corresponding working units 28. For giving the operator 32 additionally the possibility of carrying out the change of the operational parameters 27 with consideration of the operational quality of the working machine 1, an assessment input field 65 is provided additionally in the input mask 61. The assessments performed by the operator in the assessment input field 65 can be taken into consideration during the generation of new controls 52 or the correction or adaptation of available controls 52. In the simplest case, the assessment in accordance with FIG. 4 is performed quantitatively.

In a further preferable embodiment of the invention, the control editor 50, the control generator 51, the controls 52 generated by the controls generator 51, and the storage 55 for storing the controls 52 in accordance with FIG. 2 can be assembled in module 64. The module 64 can be arranged centrally and outside a working machine 1. One or several working machines 1 can be connected with this module 64 through an external data exchange system 47. Such an embodiment provides in addition a possibility for the different working machines 1 for exchanging the generated controls 52 between each other.

It will be understood that each of the elements described above, or two or more together, may also find a useful application in other types of constructions differing from the types described above.

While the invention has been illustrated and described as embodied in method of and apparatus for operating working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for operation of a working machine with at least one adjustable operating parameter of at least one working unit of the working machine, the method comprising the steps of associating the working machine with a control generator coupled to a control editor for changing the at least one operating parameter; generating by the control generator controls that are defined by a natural language program steps and storing the controls defined by natural language program steps in the control generator; changing the controls defined by natural language program steps by the control editor; defining problems by a user in a natural language; and answering the problems in the natural language by the controls stored in the control generator, so that the user can define the problems without special knowledge about a complicated relationship between the operating parameters and crop properties.

2. A method as defined in claim 1 further comprising providing a terminology of the natural language program steps in language elements.

3. A method as defined in claim 2 further comprising connecting the language elements with a source code provided in the control generator.

4. A method as defined in claim 2 further comprising forming by the language elements both input data and output data of the operational parameter to be adjusted, which lead in the control editor directly to generation of corresponding controls.

5. A method as defined in claim 4 further comprising including in the input data operational parameters of the working machine, problems during operation of the working machine, inner and outer boundary conditions, and objectives to be achieved during operation of the working machine.

6. A method as defined in claim 4 further comprising including in the output data the adjustable operational parameters of the working machine.

7. A method as defined in claim 1 further comprising generating in the stored control editable in the control generator an optimal nominal value of the at least one operational parameter; and outputting the nominal value in natural language.

8. A method as defined in claim 7 further comprising performing the outputting of the optimal nominal value of the operational parameter in a manner selected from the group consisting of visually, acoustically, and both.

9. A method as defined in claim 1 further comprising structuring the controls as controls selected from the group consisting of "when-then" controls, decision tables, flow diagrams, and combinations thereof.

10. A method as defined in claim 1 further comprising providing a storage module for storing the controls; assembling the control generator that is coupled with the control editor together with the storage module into a single module; arranging the single module centrally; and connecting a plurality of such working machines with the single module through a data exchange system.

11. A method as defined in claim 10 further comprising exchanging the generated controls between a plurality of such machines.

12. A method as defined in claim 11 further comprising connecting the plurality of the working machines with said single module; and exchanging the generated controls by the working machines.

13. A method as defined in claim 1 further comprising providing in the natural language program steps that define the controls, informations selected from the group consisting of adjustment advices and mounting instructions.

14. A method as defined in claim 1 further comprising adjusting the determined operational parameter automatically on a corresponding one of working units of the working machine.

15. A method as defined in claim 1 further comprising carrying out by a operator a qualitative assessment of the optimized adjustable operation parameter.

16. An apparatus for operating a working machine with at least one adjustable operation parameter of at least one working unit of the working machine, the apparatus comprising a control generator which is coupled with a control editor for changing the at least one operating parameter of the working machine, said control generator being operative for generating and storing controls which are defined by natural language program steps and which are editable by said control editor; and an inputting and indicating unit connected with said control generator and indicating the natural language program steps as well as results generated by said control generator; and means for defining problems by a user in a natural language and answering the problems in the natural language by the controls stored in the control generator, so that the user can define the problems without special knowledge about a complicated relationship between the operating parameters and crop properties.

17. An apparatus as defined in claim 16, wherein said apparatus is formed as an apparatus for the working machine which is an agricultural working machine.

18. A method for operation of a working machine with at least one adjustable operating parameter of at least one working unit of the working machine, the method comprising the steps of associating the working machine with a control generator coupled to a control editor for changing the at least one operating parameter; generating by the control generator and storing controls that are defined by natural language program steps; changing the controls defined by natural language program steps by the control editor; connecting an inputting indicating and unit to the control indicator; indicating by the inputting and indicating unit the natural language program steps as well as results generated by the control generator; and means for defining problems by a user in a natural language and answering the problems in the natural language by the controls stored in the control generator, so that the user can define the problems without special knowledge about a complicated relationship between the operating parameters and crop properties.

19. An apparatus for operating a working machine with at least one adjustable operation parameter of at least one working unit of the working machine, the apparatus comprising a control generator which is coupled with a control editor for changing the at least one operating parameter of the working machine, said control generator being operative for generating and storing controls which are defined by natural language program steps and which are editable by said control editor; an inputting and indicating unit connected with said control generator and indicating the natural language program steps as well as results generated by said control generator; and means for defining problems by a user in a natural language and answering the problems in the natural language by the controls stored in the control generator, so that the user can define the problems without special knowledge about a complicated relationship between the operating parameters and crop properties.

* * * * *